United States Patent
Gysling (10) Patent No.: US 8,452,551 B2
(45) Date of Patent: May 28, 2013

(54) METHOD AND APPARATUS FOR MONITORING MULTIPHASE FLUID FLOW

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 315 days.

(21) Appl. No.: 12/788,050

(22) Filed: May 26, 2010

(65) Prior Publication Data

US 2010/0305882 A1    Dec. 2, 2010

Related U.S. Application Data

(60) Provisional application No. 61/181,152, filed on May 26, 2009.

(51) Int. Cl.
*G01F 1/66* (2006.01)
*G01F 25/00* (2006.01)
*E21B 47/06* (2006.01)

(52) U.S. Cl.
CPC ..................................... *E21B 47/06* (2013.01)
USPC .......................... 702/47; 166/250.01; 702/100

(58) Field of Classification Search
CPC ....................................................... E21B 47/06
USPC ............... 702/45, 47, 48, 55, 100, 50, 98, 99; 73/861, 861.04, 861.23, 861.28, 861.42, 73/861.44, 861.48, 862; 166/250.01
See application file for complete search history.

(56) References Cited

U.S. PATENT DOCUMENTS

| 4,168,624 | A | 9/1979 | Pichon |
|---|---|---|---|
| 6,467,358 | B1 | 10/2002 | Nishi et al. |
| 6,898,541 | B2 | 5/2005 | Gysling et al. |
| 7,389,187 | B2 | 6/2008 | Kersey et al. |
| 2004/0255695 | A1 | 12/2004 | Gysling et al. |
| 2007/0067116 | A1 | 3/2007 | Rothman et al. |
| 2007/0157737 | A1 | 7/2007 | Gysling et al. |
| 2008/0236298 | A1 | 10/2008 | Gysling |
| 2009/0308601 | A1 * | 12/2009 | Poe et al. ................. 166/250.01 |

* cited by examiner

*Primary Examiner* — John H Le
(74) *Attorney, Agent, or Firm* — O' Shea Getz P.C.

(57) ABSTRACT

A method and apparatus for monitoring multiphase fluid flow passing within a pipe is provided. The method includes the steps of: a) providing a flow pressure value and a flow temperature value for the multiphase fluid flow within the pipe; b) providing a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe; c) providing a processor adapted to include an equation of state model for the pressure, volume, and temperature properties for the multiphase fluid flow, and further adapted to receive composition data values for the multiphase fluid flow, the flow pressure value, and the flow temperature value, and the flow velocity signals from the flowmeter; and d) determining a volumetric flow rate of one or both the gas phase and liquid phase of the fluid flow.

16 Claims, 6 Drawing Sheets

| Comp | Comp1 | Comp2 | Comp3 | Comp3 |
|------|-------|-------|-------|-------|
| N2   | 0.60  | 11.71 | 0.58  | 0.00  |
| CO2  | 3.34  | 6.50  | 3.27  | 0.00  |
| H2S  | 0.00  | 0.05  | 0.00  | 0.00  |
| C1   | 74.16 | 79.06 | 53.89 | 52.00 |
| C2   | 7.90  | 1.62  | 8.57  | 3.81  |
| C3   | 4.15  | 0.35  | 6.05  | 2.37  |
| iC4  | 0.71  | 0.08  | 1.05  | 0.76  |
| nC4  | 1.44  | 0.10  | 2.44  | 0.96  |
| iC5  | 0.53  | 0.04  | 0.88  | 0.69  |
| nC5  | 0.66  | 0.04  | 1.17  | 0.51  |
| C6   | 0.81  | 0.06  | 1.45  | 2.06  |
| C7   | 1.20  | 0.06  | 2.38  | 2.63  |
| C8   | 1.15  | 0.05  | 2.59  | 2.34  |
| C9   | 0.63  | 0.04  | 1.75  | 2.35  |
| C10  | 0.50  | 0.24 $^{(+)}$195 | 1.50 | 29.52 $^{(+)}$221 |
| C11  | 0.29  |       | 1.55  |       |
| C12  | 0.27  |       | 0.93  |       |
| C13  | 0.28  |       | 1.13  |       |
| C14  | 0.22  |       | 1.01  |       |
| C15  | 0.17  |       | 0.80  |       |
| C16  | 0.15  |       | 0.86  |       |
| C17  | 0.14  |       | 0.60  |       |
| C18  | 0.09  |       | 0.68  |       |
| C19  | 0.13  |       | 0.54  |       |
| C20  | 0.47 $^{(+)}$362 |  | 4.34 $^{(+)}$411 |  |

METHOD AND APPARATUS FOR MONITORING MULTIPHASE FLUID FLOW

CROSS-REFERENCE TO RELATED PATENT APPLICATIONS

This application claims the benefit of U.S. Provisional Patent Application No. 61/181,152 filed May 26, 2009, which is incorporated by reference herein in its entirety.

BACKGROUND OF THE INVENTION

1. Technical Field

This invention relates to methods and apparatuses for monitoring fluid flow within a conduit (e.g., a pipe) in general, and to monitoring the multiphase fluid flow within a conduit in particular.

2. Background Information

The ability to measure multiphase fluid flows that vary in composition is desirable, particularly in the oil and gas industry. The ability to accurately measure wet gas flows is important for a wide range of upstream oil and gas applications. While measuring dry gas flow rates with intrusive devices is well-served by a wide range of gas flow metering technologies, accurate and cost-effective measurement of wet gas flow remains a long-standing challenge for the upstream oil and gas industry.

SUMMARY OF THE INVENTION

According to an aspect of the present invention, a method of monitoring multiphase fluid flow passing within a pipe, which multiphase fluid flow includes a gas phase and a liquid phase, is provided. The method includes the steps of: a) providing a flow pressure value and a flow temperature value for the multiphase fluid flow within the pipe; b) providing a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe; c) providing a processor adapted to include an equation of state model for the pressure, volume, and temperature properties for the multiphase fluid flow, and further adapted to receive composition data values for the multiphase fluid flow, the flow pressure value, and the flow temperature value, and the flow velocity signals from the flowmeter; and d) determining a volumetric flow rate of one or both the gas phase and liquid phase of the fluid flow.

In one embodiment of the aforesaid method, the fluid flow meter is adapted to produce first flow velocity values, and the method further includes the steps of: a) providing a second fluid flowmeter that is adapted to produce second flow velocity values; b) determining a measured value for a fluid flow parameter using the first flow velocity values and the second flow velocity values; c) determining a calculated value for the fluid flow parameter using the flow pressure value and the flow temperature value and the equation of state model; d) comparing the measured and calculated values of the fluid flow parameter to determine an error value; e) determining modified composition data values using the current composition data values if the error value exceeds a predetermined value, and iteratively repeating the steps of determining the calculated values, comparing the measured and calculated values, and determining modified composition data values until the error value is less than the predetermined value or other condition is met; and f) determining the volumetric flow rate of one or both the gas phase and liquid phase of the fluid flow using the modified composition data values.

In another embodiment, the method further includes the steps of: a) providing a watercut value for the multiphase fluid flow within the pipe; b) determining a measured speed of sound value for the liquid phase of the multiphase fluid flow; c) determining a calculated speed of sound value for the liquid phase of the multiphase fluid flow using the flow pressure value and the flow temperature value and the equation of state model; d) comparing the measured and calculated values of the speed of sound value for the liquid phase of the multiphase fluid flow to determine a SOS error value; e) determining a modified watercut value using the current watercut value if the SOS error value exceeds a predetermined value, and iteratively repeating the steps of determining the calculated SOS value, comparing the measured and calculated SOS values, and determining a modified watercut value until the SOS error value is less than the predetermined value or other condition is met; and f) determining the volumetric flow rate of one or both the gas phase and liquid phase of the fluid flow using the modified watercut value.

According to another aspect of the present invention, an apparatus for monitoring multiphase fluid flow passing within a pipe is provided that includes a fluid flow meter and a processor. The fluid flowmeter is operable to be attached to an exterior of the pipe, and includes a spatial array of at least two sensors disposed at different axial positions along the pipe. The flowmeter is adapted to produce flow velocity signals indicative of a velocity of the fluid flow traveling within the pipe. The processor is adapted to include an equation of state model for the pressure, volume, and temperature properties for the multiphase fluid flow. The processor is further adapted to receive composition data values for the multiphase fluid flow, a flow pressure value, a flow temperature value, and the flow velocity signals from the flowmeter, and to determine a volumetric flow rate of one or both the gas phase and liquid phase of the fluid flow using the equation of state model, the composition data values, the flow pressure value, the flow temperature value, and the flow velocity signals.

The foregoing and other objects, features and advantages of the present invention will become more apparent in light of the following drawings and detailed description of the present invention.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
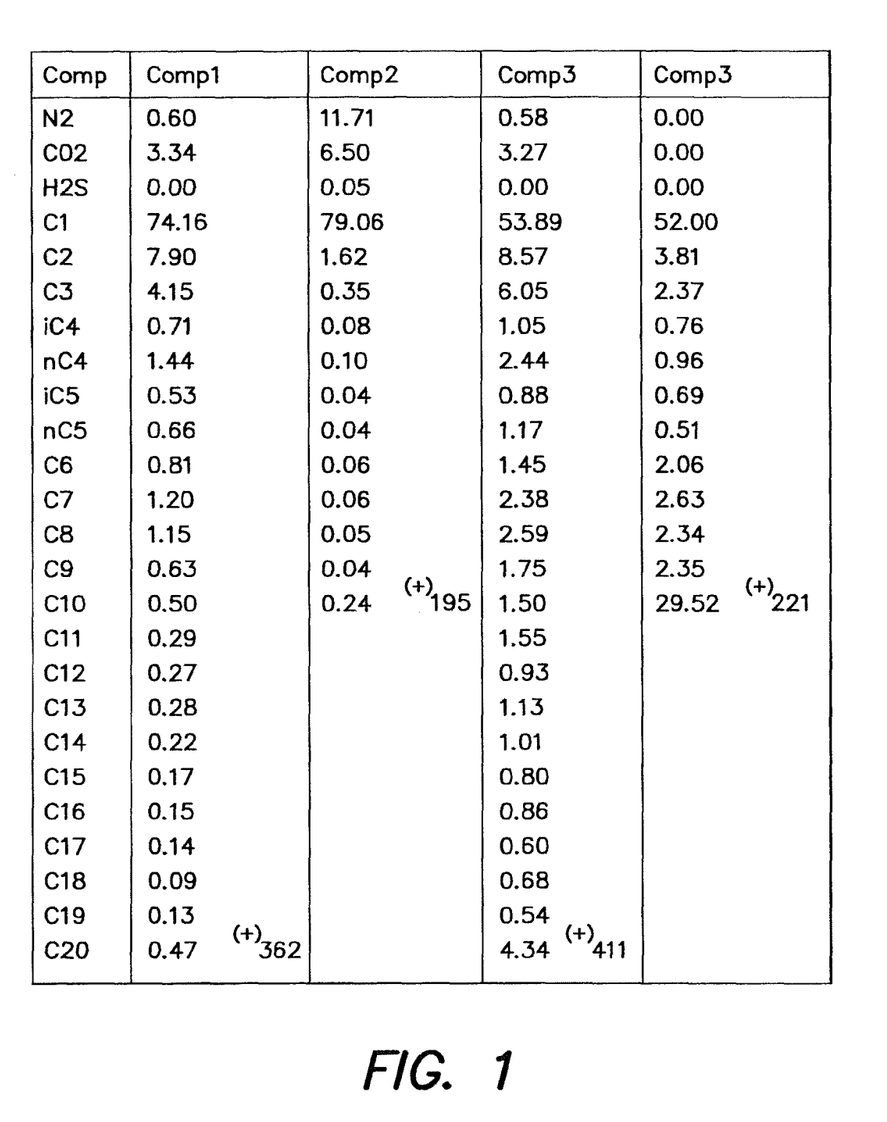
FIG. 1 is a table containing exemplary values for a number of hydrocarbon flow compositions, listing the various constituents mole percentages.

The present invention provides a method and apparatus for monitoring multiphase fluid flow within a pipe. The term "pipe" is used herein to refer to any conduit operable to contain a fluid flow, and is not limited to circular piping. Multiphase fluid flows (including a gas phase and one or more liquid phases) are common in commercial applications. Perhaps one of the best known multiphase flow applications can be found in the gas and oil industry, where well head fluid flows commonly contain both gas and hydrocarbon liquids, as well as water. The hydrocarbon liquids emanating from the well are almost always a composition of a variety of hydrocarbon constituents. FIG. 1, for example, contains a table of exemplary hydrocarbon flow compositions, listing the various constituents' mole percentages. One of the challenges of multiphase flow measurement is that the composition of a given flow is often not known, and even if known, it can vary over time. As will be described below, embodiments of the present invention permit the determination of volumetric flow rates of the different phases of the multiphase flow.

Figure 2:
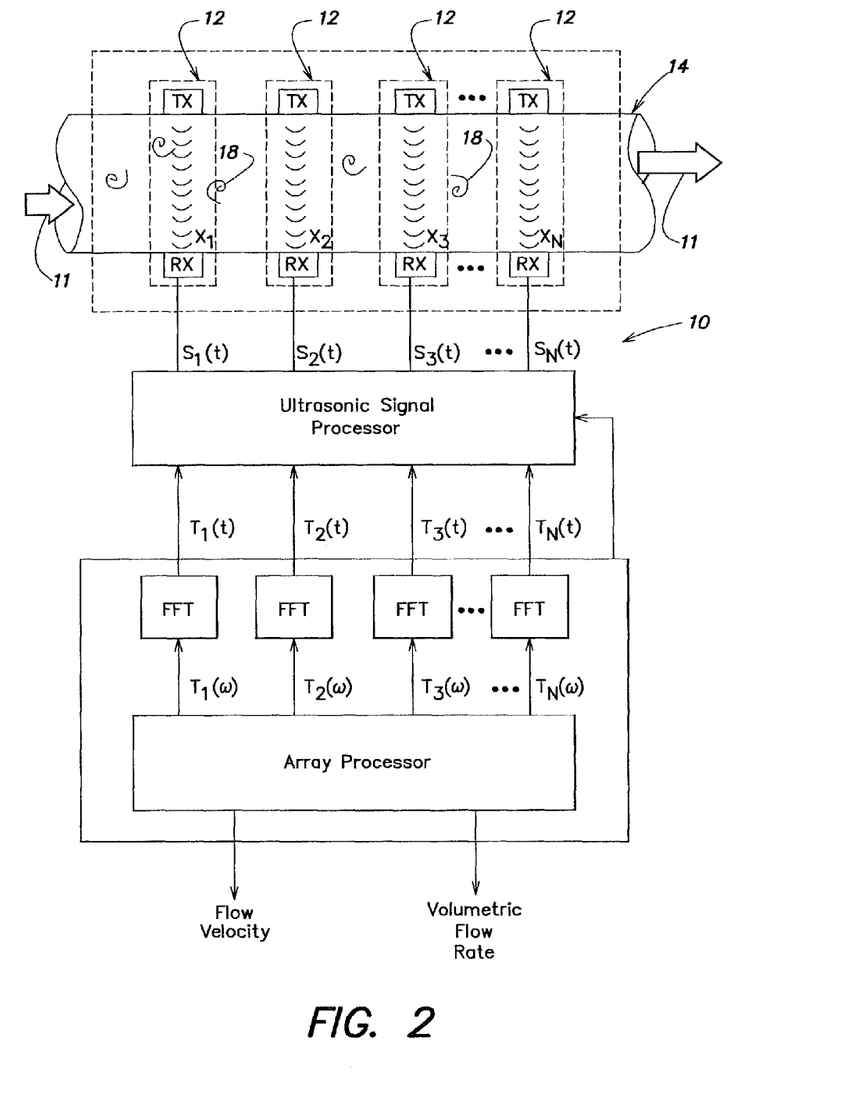
FIG. 2 is a diagrammatic illustration of a fluid flowmeter.

Now referring to FIG. 2, the present invention utilizes a SONAR-type flowmeter 10 that includes a spatial array of at least two sensors 12 disposed at different axial positions ($x_1$, $x_2$, ... $x_n$) along a pipe 14. Each of the sensors 12 provides a signal indicative of a characteristic of the flow 11 passing through the pipe 14. The signals from the sensors 12 are sent to a processor where they are processed to determine the velocity of the flow 11 passing within the pipe 14 by the sensor array. The volumetric flow 11 can then be determined by multiplying the velocity of the fluid by the cross-sectional area of the pipe 14.

U.S. Pat. No. 7,389,187, which is hereby incorporated by reference in its entirety, discloses a SONAR flowmeter 10 that can be used with the present invention. The flowmeter 10, diagrammatically illustrated in FIG. 2, includes an array of ultrasonic sensors 12, each of which sensors include a transmitter (Tx) and a receiver (Rx) typically positioned orthogonally across from one another on opposite sides of the pipe 14. Each sensor 12 measures the transit time of an ultrasonic signal (sometimes referred to as "time of flight" or "TOF") passing from the transmitter to the receiver. The TOF measurement is influenced by coherent properties that convect within the flow 11 within the pipe 14 (e.g., vortical disturbances 18, bubbles, particles, etc.). These convective properties, which convect with the flow 11, are in turn indicative of the velocity of the flow 11 within the pipe 14. The effect of the vortical disturbances 18 (and/or other inhomogenities within the fluid) on the TOF of the ultrasonic signal is to delay or speed up the transit time, and particular vortical disturbances 18 can be tracked between sensors.

An ultrasonic signal processor is used to coordinate the transmission of signals from the transmitters and the receipt of signals from the receivers ($S_1(t)$-$S_N(t)$). The signal processor processes the data from each of the sensors 12 to provide an analog or digital output signal ($T_1(t)$-$T_N(t)$) indicative of the TOF of the ultrasonic signal through the fluid. The output signals ($T_1(t)$-$T_N(t)$) from the ultrasonic signal processor are provided to another processor (e.g., an array processor), which processes the transit time data to determine flow parameters such as flow velocity and volumetric flow rate. The SONAR flowmeter 10 described in U.S. Pat. No. 7,389,187, and diagrammatically shown here in FIG. 2, represents an example of a flowmeter that can be used with the present invention. The present invention is not limited to this particular flowmeter embodiment, however.

Figure 3:
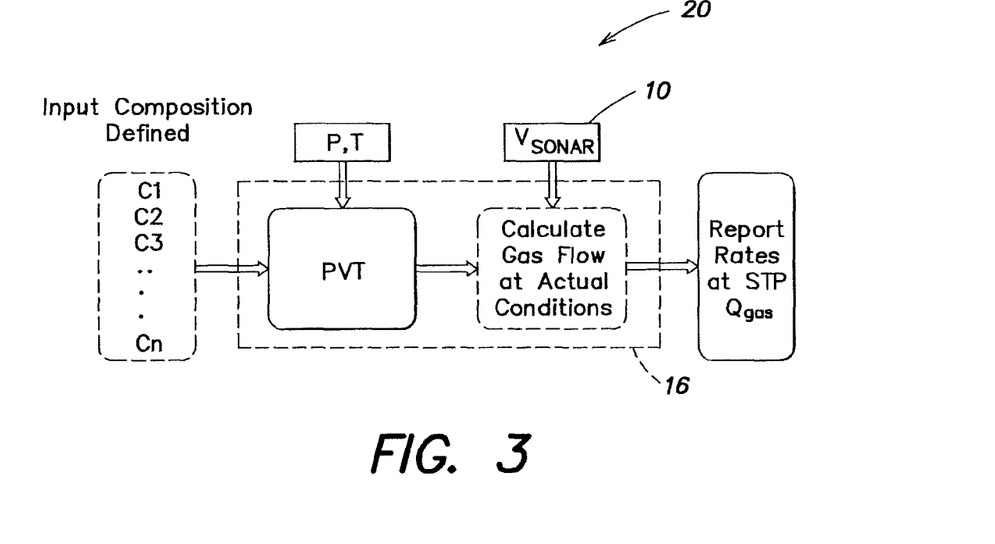
FIG. 3 is a block diagram that diagrammatically illustrates a flow chart of the input, operation, and output of an embodiment of the present invention monitoring system and method.

Now referring to FIG. 3, in a first embodiment of the present invention, a system 20 for monitoring a multiphase fluid flow 11 is provided that utilizes a SONAR flowmeter 10 and a processor 16, the latter adapted to include an equation of state model for the pressure, volume, and temperature properties for the multiphase hydrocarbon fluid flow 11 being evaluated. The aforesaid first embodiment of the system 20 may also be described in terms of a method for monitoring a multiphase fluid flow 11. FIG. 3 diagrammatically illustrates a flow chart of the input, operation, and output of the first embodiment of the system 20. The equation of state model is typically referred to as a "PVT Model". PVT Models are commercially available. An example of a PVT Model that can be used is the "PVTsim" model produced by Calsep A/S of Lyngby, Denmark. The processor 16 is further adapted to receive: 1) composition data representative of the hydrocarbon fluid flow 11 (i.e., "hydrocarbon composition values" listed as "C1, C2, C3 ... Cn"); 2) flow pressure data (e.g., a flow pressure value from a pressure sensor; i.e., "P"); 3) flow temperature data (e.g., a flow temperature value from a temperature sensor; i.e., "T"); and 4) flow velocity data from the SONAR flowmeter 10 ("$V_{SONAR}$"). Using the pressure and temperature values, the flow velocity determined from the flowmeter 10, and the PVT Model, the processor 16 is adapted to determine the volumetric flow rates of one or both the gas and liquid phases of the fluid flow 11 at one or both of the actual temperature and pressure or a standard temperature and pressure (e.g., ambient temperature and pressure). An initial value set for the hydrocarbon fluid flow composition can be based on historical data, empirical testing, etc. The composition values can be adjusted as necessary to increase the accuracy of the values relative to the actual flow 11.

The processor 16 that is adapted to accept and produce the aforesaid inputs and outputs, respectively, may be a microprocessor, a personal computer, or other general purpose computer, or any type of analog or digital signal processing device adapted to execute programmed instructions. Further, it should be appreciated that some or all of the functions associated with the flow logic of the present invention may be implemented in software (using a microprocessor or computer) and/or firmware, or may be implemented using analog and/or digital hardware, having sufficient memory, interfaces, and capacity to perform the functions described herein.

Figure 4:
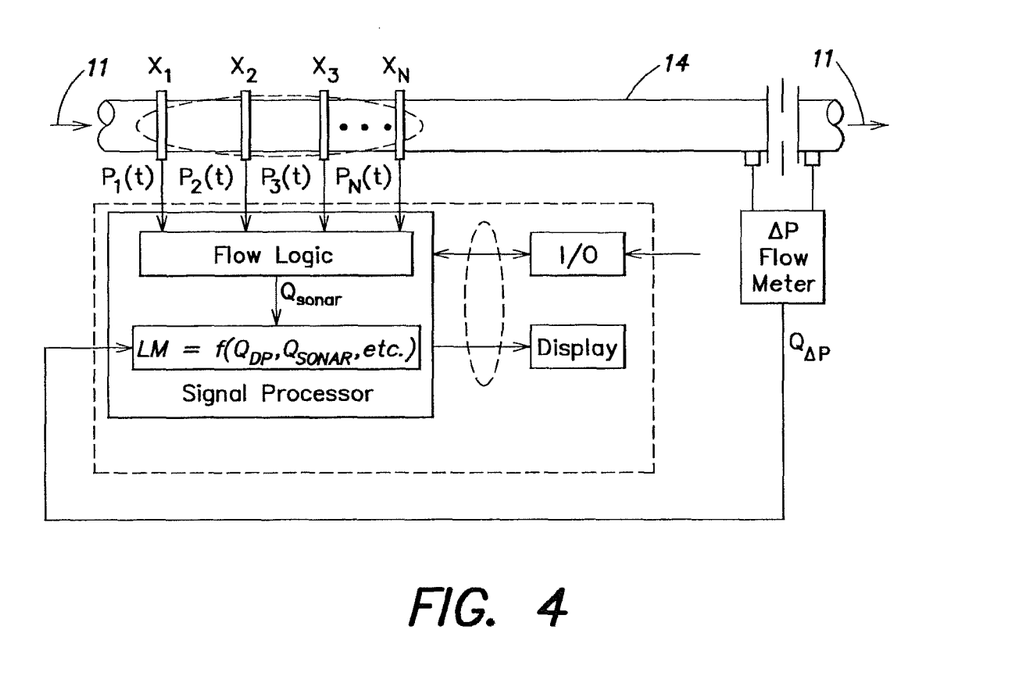
FIG. 4 is a diagrammatic illustration of a SONAR fluid flowmeter disposed in cooperation with a DP fluid flow meter.
Figure 5:
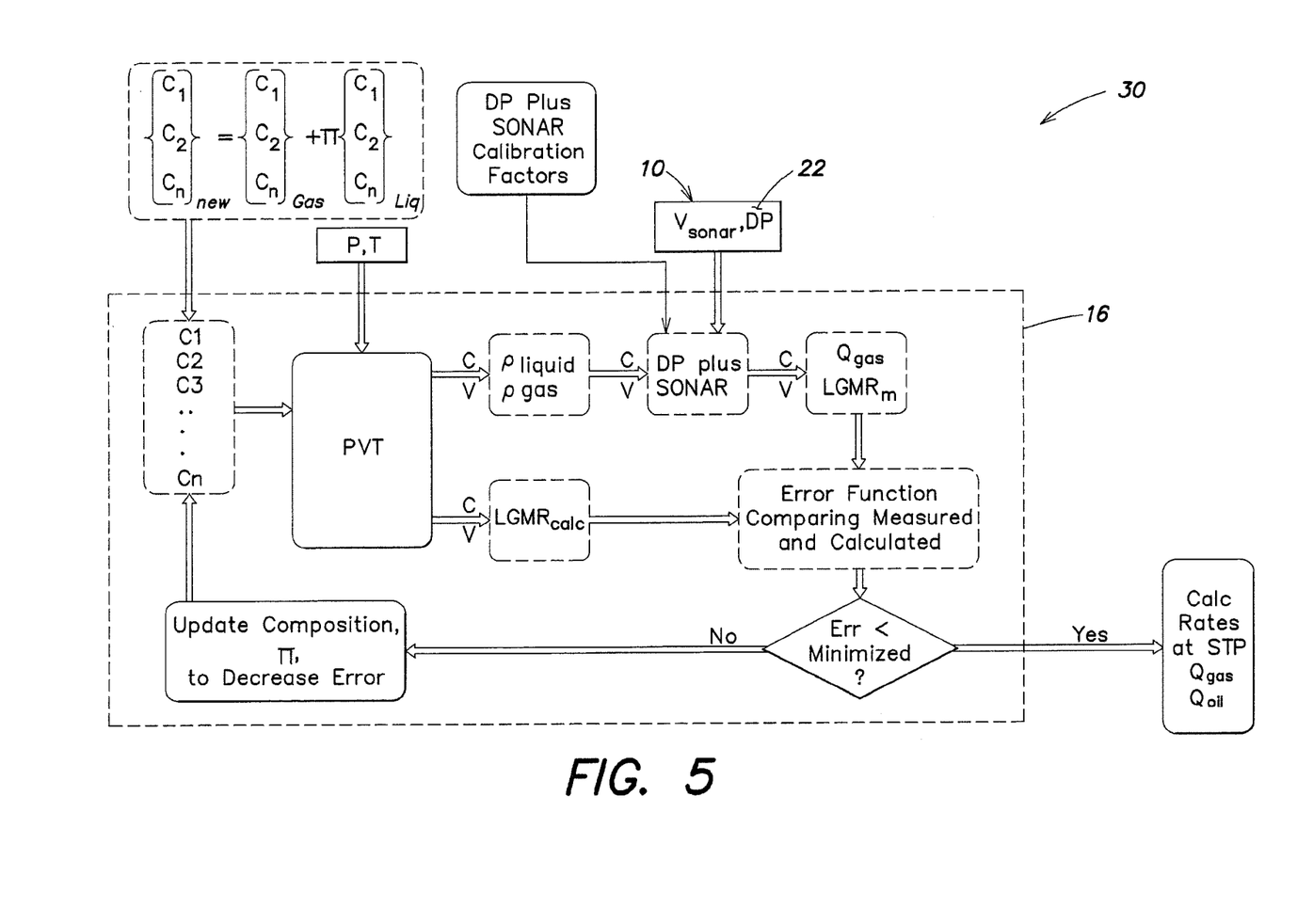
FIG. 5 is a block diagram that diagrammatically illustrates a flow chart of the input, operation, and output of another embodiment of the present invention monitoring system and method.

Now referring to FIGS. 4 and 5, in a second embodiment of the present invention, a system 30 (see FIG. 5) for monitoring a multiphase fluid flow 11 is provided that utilizes a SONAR flowmeter 10 as described above. The aforesaid system 30 may also be described in terms of a method for monitoring a multiphase fluid flow 11. In addition, this embodiment further includes a differential pressure-based flow meter 22, commonly referred to as a "DP flowmeter". DP flowmeters 22 can be used to monitor gas production and are well-known to over-report the gas flow rate of a multiphase fluid flow 11 in the presence of liquids within the multiphase flow 11. The tendency of a DP flowmeter 22 to over report due to wetness indicates a strong correlation with the liquid to gas mass ratio of the flow 11. As used herein, the term "DP flowmeter" refers to a device that is operable to determine a pressure drop of a flow of fluid, or gas, or mixture thereof, traveling within a pipe 14 across a constriction within that pipe 14, or through a flow length of pipe 14. Examples of DP flowmeters 22 that utilize a constriction include, but are not limited to, venturi, orifice, elbow, V-cone, and wedge type flowmeters.

This embodiment of the present invention utilizes both a SONAR flowmeter 10 and a DP flowmeter 22 to leverage the fact that SONAR flowmeters 10 and DP flowmeters 22 report gas flow rates differently in the presence of liquids within a multiphase flow 11. Specifically, a SONAR flowmeter 10 will continue to accurately report gas flow rates, independent of the liquid loading, but a DP flowmeter 22 will over report gas flow rates when a liquid is present within a multiphase flow 11 (i.e., a "wet gas flow"). The insensitivity of the SONAR flowmeter 10 to "wetness" within the flow 11 provides a practical means for accurately measuring the gas flow rate and the liquid flow rate of a wet gas flow 11. In the processing of the combined data (i.e. data obtained from the DP flowmeter 22 and the SONAR flowmeter 10), a set of local wetness sensitivity coefficients for each wetness series (at fixed pressure and flow rate) can be used to provide a more accurate characterization for both the DP flowmeter 22 and the SONAR flowmeter 10 to determine wetness. The wetness sensitivity coefficients for each device may be provided by a low order polynomial fit of the over-report vs. wetness. This characterization may then be used to "invert" the outputs of the DP flowmeter 22 and the SONAR flowmeter 10 to provide an accurate gas flow rate and an accurate liquid flow rate. The use of a SONAR flowmeter 10 and a DP flowmeter 22 in concert to accurately determine the liquid and gas flow rates of a multiphase fluid flow 11 is described in detail in U.S. Patent Publication No. 2008/0236298 (hereinafter referred to as "the '298 Publication"), which is hereby incorporated by reference herein its entirety. For example, the '298 Publication describes that the volumetric flow rate through a SONAR flowmeter 10 can be expressed as: $Q_{SONAR}=(1+\alpha MR)Q_{gas}$ and flow rate through a DP flowmeter 22 can be expressed as: $Q_{venturi}=(1+\beta MR+\chi MR^2)Q_{gas}$, where $\alpha$, $\beta$, and $\chi$ are empirically determined wetness sensitivity coefficients, MR is the liquid to gas mass ratio, and $Q_{gas}$ is the volumetric flow rate of the gas phase of the fluid flow. These equations represent examples of how wetness sensitivity coefficients may be determined, and the present invention is not limited to these particular embodiments. FIG. 4 diagrammatically illustrates a flow metering arrangement that utilizes a SONAR flowmeter 10 operating in concert with a DP flowmeter 22, both of which provide signals to the processor 16 that is adapted to output gas and liquid flow rates for a multiphase fluid flow 11.

In the second embodiment 30 of the system, which is diagrammatically illustrated in FIG. 5, the processor 16 is adapted to receive: 1) a set of hydrocarbon composition values (C1, C2, . . . Cn); 2) flow pressure data (e.g., a flow pressure value from a pressure sensor; "P"); 3) flow temperature data (e.g., a flow temperature value from a temperature sensor; "T"); 4) flow velocity data from the SONAR flow meter ($V_{SONAR}$); and 5) flow velocity data from the DP flowmeter ("DP"). In some embodiments, the processor 16 also receives calibration data such as wetness sensitivity coefficients for one or both flowmeters 10,22. With the received inputs from the flowmeters 10,22, the processor 16 calculates a fluid flow parameter value; e.g., a liquid gas mass ratio (LGMR). This fluid flow parameter reflects a "measured" value based on the fact that the data used to calculate the value is taken from the flowmeters 10,22 measuring the actual fluid flow 11. The processor 16 also determines a "calculated" value for the fluid flow parameter (e.g., a "calculated" LGMR) based on the PVT model, given the input pressure and temperature values. The calculated fluid flow parameter value is then compared to the measured fluid flow parameter value and an error function evaluates any difference between the values. If the error value is within an acceptable range of values (or greater/less than a threshold value), one or more phase flow rates based on either calculated or measured values are determined and reported. If the flow rates are determined at temperature and pressure values other than standard values, the processor 16 is adapted to flash those flow rate values to analogous values at a predetermined standard temperature and pressure.

If the error value is outside the acceptable range of values (or less/greater than a threshold value), the processor 16 is adapted to produce a modified set of hydrocarbon composition values based on the initial set of hydrocarbon composition values, and iteratively repeat the above-described process using the modified values. The modification of the hydrocarbon composition values can be performed using a variety of different functions. An example of a function that can be used is as follows:

$$\begin{Bmatrix} c_1 \\ c_2 \\ c_n \end{Bmatrix}_{new} = \begin{Bmatrix} c_1 \\ c_2 \\ c_n \end{Bmatrix}_{gas} + \prod \begin{Bmatrix} c_1 \\ c_2 \\ c_n \end{Bmatrix}_{liq} \quad \text{(Eqn. 1)}$$

where "$\Pi$" is a variable that is a function of the gas/oil ratio ("$f(GOR)$") of the composition, and which variable can be iteratively adjusted to improve the agreement between the measured values and the calculated values. An example of a "$f(GOR)$" variable is:

$$\gamma \frac{\# molesLiquid}{\# molesGas}$$

where "$\gamma$" is a variable that can be iteratively adjusted, and the number of moles of liquid and gas for the flow 11 are determined for a particular pressure and temperature. The processor 16 is adapted to iteratively repeat the process until the error function is satisfied and the flow rates are reported.

The above description identifies LGMR as an example of a fluid flow parameter that can be both calculated and measured to permit the above described comparison. The present invention is not limited to using LGMR as the fluid flow parameter, and other fluid flow parameters (e.g., the Lockhardt Martinelli (LM) number) can be used alternatively.

Figure 6:
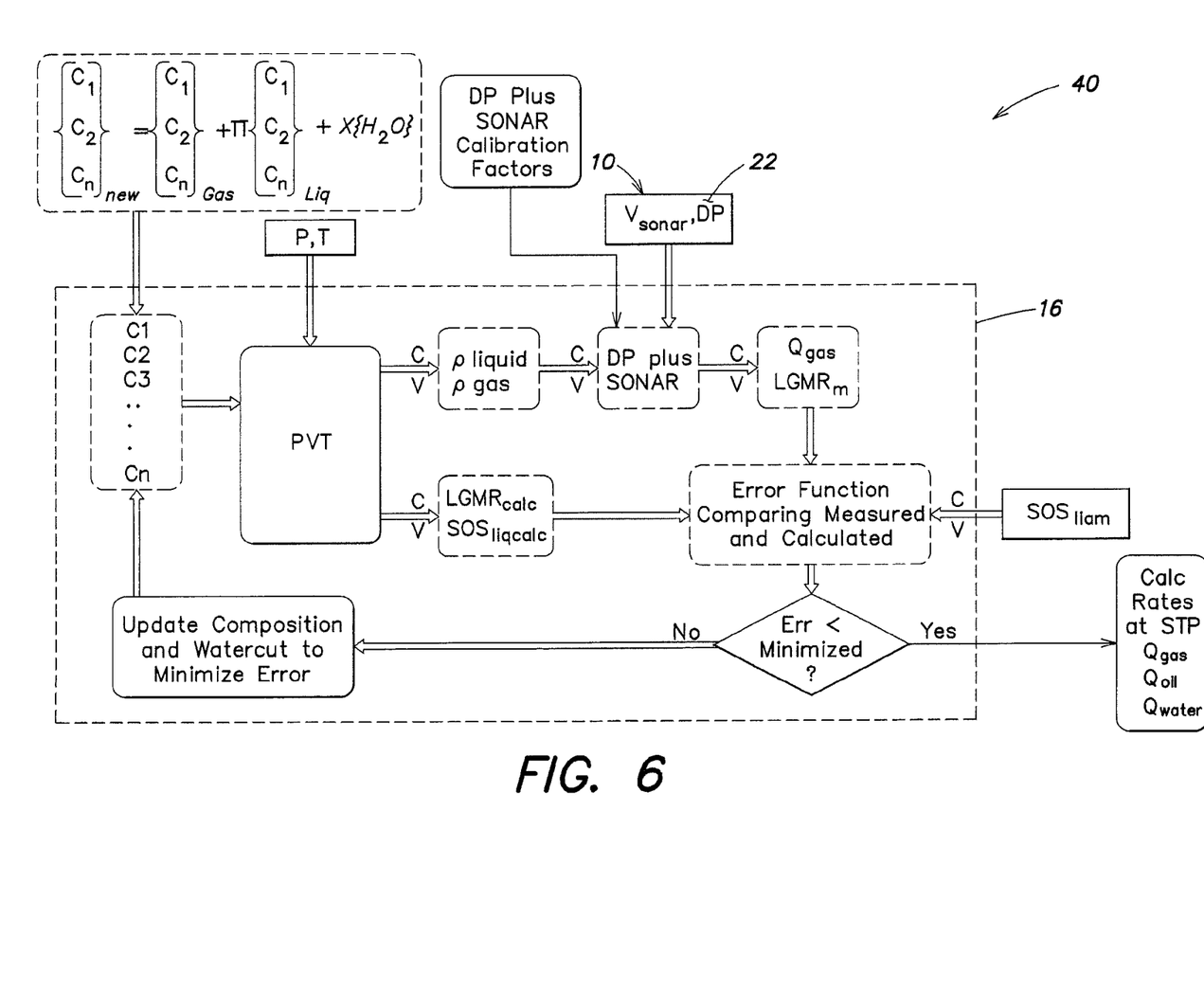
FIG. 6 is a block diagram that diagrammatically illustrates a flow chart of the input, operation, and output of another embodiment of the present invention monitoring system and method.

In a third embodiment 40 of the system, which is diagrammatically shown in FIG. 6, the present monitoring system 40 is configured to be operable for a three phase fluid: gas, hydrocarbon liquid (e.g., oil), and water. The aforesaid system 40 may also be described in terms of a method for monitoring a multiphase fluid flow 11. In this embodiment, the processor 16 is adapted to receive: 1) an initial set of hydrocarbon composition values, including an initial watercut value; 2) flow pressure data (e.g., a flow pressure value from a pressure sensor); 3) flow temperature data (e.g., a flow temperature value from a temperature sensor); 4) flow velocity data from the SONAR flowmeter 10; 5) flow velocity data from the DP flowmeter 22; and 6) a measured continuous speed of sound (SOS) value for the liquid phase within the fluid flow 11. Here again, the processor 16 may also receive calibration data for one or both flowmeters 10,22. With the received inputs from the flowmeters 10,22, the processor 16 calculates a "measured" fluid flow parameter value (e.g., a measured LGMR) as described above. The processor 16 also determines "calculated" values for the fluid flow parameter (e.g., a "calculated" LGMR) and for the SOS for the liquid phase within the fluid flow 11 based on the PVT Model, given the input pressure and temperature values. The calculated fluid flow parameter and SOS values are then compared to the measured fluid flow parameter and SOS values and an error function evaluates any difference between the respective values. If the error values are within an acceptable range of values (or greater/less than a threshold value), phase flow rates (e.g., at standard temperature and pressure) are determined and reported.

If one or both error values are outside the acceptable range of values (or less/greater than a threshold value), the processor 16 is adapted to produce a modified set of hydrocarbon composition values for the fluid flow 11, including a watercut value. If the composition values for the hydrocarbon components of the fluid flow 11 are known and the watercut value of the fluid flow 11 is not known, then a modified set of hydrocarbon composition values can be determined by varying only the watercut. For example, using the above-described example as a basis, the modified set could be created by holding "Π" constant and varying "χ" in the following equation:

$$\begin{Bmatrix} c_1 \\ c_2 \\ c_n \end{Bmatrix}_{new} = \begin{Bmatrix} c_1 \\ c_2 \\ c_n \end{Bmatrix}_{gas} + \prod \begin{Bmatrix} c_1 \\ c_2 \\ c_n \end{Bmatrix}_{liq} + \chi H_2O \quad \text{(Eqn. 2)}$$

where "χ" is a variable that can be iteratively adjusted to alter the watercut (i.e., "$H_2O$") contribution and thereby improve the agreement between the measured values and the calculated values. As indicated above, the processor 16 is adapted to iteratively repeat the process until the error function is satisfied and the flow rates are reported.

Figure 7:
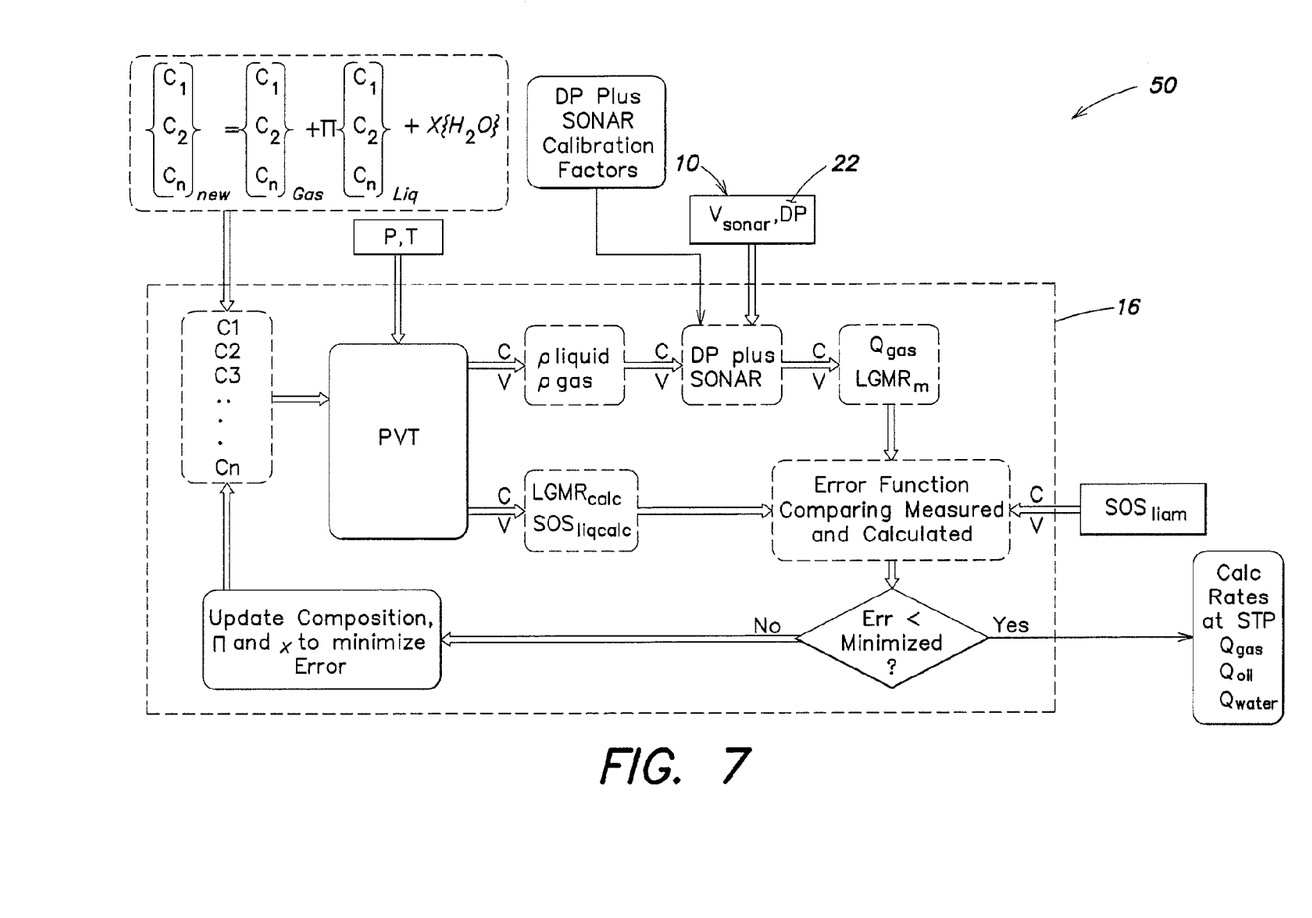
FIG. 7 is a block diagram that diagrammatically illustrates a flow chart of the input, operation, and output of another embodiment of the present invention monitoring system and method.

A fourth embodiment 50 of the present monitoring system, which is diagrammatically shown in FIG. 7, can also be used for monitoring a three phase fluid, containing gas, hydrocarbon liquid, and water. This system embodiment 50 can be used in applications where neither the composition values for the hydrocarbon components of the fluid flow 11 nor the watercut value is known. In this embodiment, the processor 16 is adapted to receive inputs similar to those received in the third embodiment: 1) an initial set of hydrocarbon composition values, including an initial watercut value; 2) flow pressure data (e.g., a flow pressure value from a pressure sensor); 3) flow temperature data (e.g., a flow temperature value from a temperature sensor); 4) flow velocity data from the SONAR flowmeter 10; 5) flow velocity data from the DP flowmeter 22; and 6) a measured continuous speed of sound (SOS) value for the liquid phase within the fluid flow 11. In some embodiments, the processor is adapted to also receive a measured continuous speed of sound (SOS) value for the gas phase within the fluid flow 11. The measured SOS values could, for example, be determined using ultrasonic sensors positioned within liquid and gas legs of the flow 11 after separation to determine a TOF of the respective flow 11. The TOF data could be used subsequently to determine the respective measured phase fraction of the fluid flow 11. Measuring the SOS in a singular multiphase fluid flow is known in the art and the present invention is not limited to any particular technique (e.g., densitometers, etc.). The SOS values for the gas phase of the flow can be used in a manner similar to that described above, wherein a calculated value of the gas SOS is compared to a measured value of the gas SOS, and the gas SOS adjusted to increase the accuracy of the system. Utilizing the gas SOS in the aforesaid iterative manner can provide substantial utility, for example, in those applications wherein the gas phase comprises a plurality of different hydrocarbon constituents (e.g., C1, Methane; C2, Ethane). The SOS can be used to identify which constituents are present.

With the received inputs from the flowmeters 10, 22, the processor calculates a "measured" fluid flow parameter value (e.g., a measured LGMR) as described above. The processor also determines a "calculated" value for the fluid flow parameter (e.g., a "calculated" LGMR) and a calculated SOS for the liquid within the fluid flow 11 based on the PVT model, given the input pressure and temperature values. The calculated fluid flow parameter value is then compared to the measured fluid flow parameter value and an error function evaluates any difference between the values. The SOS values can also be evaluated in a similar manner. If the error values are within an acceptable range of values, phase flow rates (e.g., at standard temperature and pressure) for all three phases are determined and reported.

If either of the error values is outside its respective acceptable range of values, the processor 16 is adapted to produce a modified set of hydrocarbon composition values for the fluid flow 11, including the phase fraction values. The modified set of hydrocarbon composition values can be determined by adjusting the "Π" and "χ" variables (shown in Eqn. 2 above) until acceptable values for each phase contribution are reached.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method of monitoring multiphase fluid flow passing within a pipe, which multiphase fluid flow includes a gas phase and a liquid phase, the method comprising the steps of:
   providing a flow pressure value and a flow temperature value for the multiphase fluid flow within the pipe;
   providing a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe;
   providing a processor adapted to include an equation of state model for pressure, volume, and temperature properties for the multiphase fluid flow, and further adapted to receive composition data values for the multiphase fluid flow, the flow pressure value, and the flow temperature value, and the flow velocity signals from the flowmeter;
   determining a volumetric flow rate of one or both the gas phase and liquid phase of the fluid flow;
   wherein each of the composition data values includes at least one value representative of a hydrocarbon constituent of the multiphase fluid flow.

2. The method of claim 1, wherein the sensors of the fluid flowmeter each include an ultrasonic transmitter operable to transmit an ultrasonic signal, and an ultrasonic receiver operable to receive the transmitted ultrasonic signal, wherein the flowmeter is operable to sense the fluid flow within the pipe for coherent properties convecting within the fluid flow.

3. The method of claim 1, further comprising the step of determining a volumetric flow rate of one or both the gas phase and liquid phase of the fluid flow at standard pressure and temperature values.

4. The method of claim 1, wherein the fluid flow meter is a first fluid flowmeter that is adapted to produce first flow velocity values, and wherein the method further includes the steps of:
 providing a second fluid flowmeter that is adapted to produce second flow velocity values;
 determining a measured value for a fluid flow parameter using the first flow velocity values and the second flow velocity values;
 determining a calculated value for the fluid flow parameter using the flow pressure value and the flow temperature value and the equation of state model;
 comparing the measured and calculated values of the fluid flow parameter to determine an error value;
 determining modified composition data values using the current composition data values if the error value exceeds a predetermined value, and iteratively repeating the steps of determining the calculated value, comparing the measured and calculated values, and determining modified composition data values until the error value is less than the predetermined value or other condition is met; and
 determining the volumetric flow rate of one or both the gas phase and liquid phase of the fluid flow using the modified composition data values.

5. The method of claim 4, wherein the first fluid flowmeter is a SONAR type fluid flowmeter and the second fluid flowmeter is a DP flowmeter.

6. The method of claim 4, further comprising the steps of:
 providing a watercut value for the multiphase fluid flow within the pipe;
 determining a measured speed of sound value for the liquid phase of the multiphase fluid flow;
 determining a calculated speed of sound value for the liquid phase of the multiphase fluid flow using the flow pressure value and the flow temperature value and the equation of state model;
 comparing the measured and calculated values of the speed of sound value for the liquid phase of the multiphase fluid flow to determine a SOS error value;
 determining a modified watercut value using the current watercut value if the SOS error value exceeds a predetermined value, and iteratively repeating the steps of determining the calculated SOS value, comparing the measured and calculated SOS values, and determining a modified watercut value until the SOS error value is less than the predetermined value or other condition is met; and
 determining the volumetric flow rate of one or both the gas phase and liquid phase of the fluid flow using the modified watercut value.

7. A method of monitoring multiphase fluid flow passing within a pipe, which multiphase fluid flow includes a gas phase and a liquid phase, the method comprising the steps of:
 providing a flow pressure value and a flow temperature value for the multiphase fluid flow within the pipe;
 providing a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe;
 providing a processor adapted to include an equation of state model for pressure, volume, and temperature properties for the multiphase fluid flow, and further adapted to receive composition data values for the multiphase fluid flow, the flow pressure value, and the flow temperature value, and the flow velocity signals from the flowmeter;
 determining a volumetric flow rate of one or both the gas phase and liquid phase of the fluid flow;
 wherein the fluid flow meter is a first fluid flowmeter, and wherein the method further includes the step of providing a second fluid flowmeter, which second fluid flow meter is sensitive to wetness within the multiphase fluid flow and will over-report a gas flow rate of the multiphase fluid flow when the multiphase fluid flow contains liquid, and wherein the first fluid flowmeter is insensitive to wetness within the multiphase fluid flow relative to the second fluid flowmeter.

8. The method of claim 7, wherein the processor is adapted to receive first flow velocity signals from the first fluid flowmeter, and second flow velocity signals from the second fluid flowmeter.

9. An apparatus for monitoring multiphase fluid flow passing within a pipe, which multiphase fluid flow includes a gas phase and a liquid phase, the apparatus comprising:
 a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe;
 a processor adapted to include an equation of state model for pressure, volume, and temperature properties for the multiphase fluid flow, and further adapted with or to receive composition data values for the multiphase fluid flow, a flow pressure value, a flow temperature value, and the flow velocity signals from the flowmeter, and to determine a volumetric flow rate of one or both the gas phase and liquid phase of the fluid flow using the equation of state model the composition data values, the flow pressure value, the flow temperature value, and the flow velocity signals;
 wherein each of the composition data values includes at least one value representative of a hydrocarbon constituent of the multiphase fluid flow.

10. The apparatus of claim 9, wherein the sensors of the fluid flowmeter each include an ultrasonic transmitter operable to transmit an ultrasonic signal, and an ultrasonic receiver operable to receive the transmitted ultrasonic signal, wherein the flowmeter is operable to sense the fluid flow within the pipe for coherent properties convecting within the fluid flow.

11. The apparatus of claim 9, wherein the processor is further adapted to determine a volumetric flow rate of one or both the gas phase and liquid phase of the fluid flow at standard pressure and temperature values.

12. The apparatus of claim 9, wherein the fluid flow meter is a first fluid flowmeter that is adapted to produce first flow velocity values, and wherein the apparatus further comprises a second fluid flowmeter that is adapted to produce second flow velocity values; and
 wherein the processor is further adapted to determine a measured value for a fluid flow parameter using the first flow velocity values and the second flow velocity values, and to determine a calculated value for the fluid flow parameter using the flow pressure value and the flow temperature value and the equation of state model, and to compare the measured and calculated values of the fluid flow parameter to determine an error value, and to determine modified composition data values using the current composition data values if the error value exceeds a predetermined value, and iteratively determine the calculated value, compare the measured and calculated values, and determine the modified composition data values until the error value is less than the predetermined value or other condition is met, and to determine the volumetric flow rate of one or both the gas phase and liquid phase of the fluid flow using the modified composition data values.

13. The apparatus of claim 12, wherein the first fluid flowmeter is a SONAR type fluid flowmeter and the second fluid flowmeter is a DP flowmeter.

14. The apparatus of claim 12, wherein the processor is further adapted to determine a watercut value for the multiphase fluid flow within the pipe, and to determine a measured speed of sound value for the liquid phase of the multiphase fluid flow, and to determine a calculated speed of sound value for the liquid phase of the multiphase fluid flow using the flow pressure value and the flow temperature value and the equation of state model, and to compare the measured and calculated values of the speed of sound value for the liquid phase of the multiphase fluid flow to determine a SOS error value, and to determine a modified watercut value using the current watercut value if the SOS error value exceeds a predetermined value, and to iteratively determine the calculated SOS value, compare the measured and calculated SOS values, and to determine a modified watercut value until the SOS error value is less than the predetermined value or other condition is met, and to determine a volumetric flow rate of one or both the gas phase and liquid phase of the fluid flow using the modified watercut value.

15. An apparatus for monitoring multiphase fluid flow passing within a pipe, which multiphase fluid flow includes a gas phase and a liquid phase, the apparatus comprising:
   a fluid flowmeter operable to be attached to an exterior of the pipe, the flowmeter including a spatial array of at least two sensors disposed at different axial positions along the pipe, which flowmeter is adapted to produce flow velocity signals indicative of a velocity of the fluid flow traveling within the pipe;
   a processor adapted to include an equation of state model for pressure, volume, and temperature properties for the multiphase fluid flow, and further adapted with or to receive composition data values for the multiphase fluid flow, a flow pressure value, a flow temperature value, and the flow velocity signals from the flowmeter, and to determine a volumetric flow rate of one or both the gas phase and liquid phase of the fluid flow using the equation of state model the composition data values, the flow pressure value, the flow temperature value, and the flow velocity signals;
   wherein the fluid flow meter is a first fluid flowmeter, and the apparatus further includes a second fluid flowmeter, which second fluid flow meter is sensitive to wetness within the multiphase fluid flow and will over-report a gas flow rate of the multiphase fluid flow when the multiphase fluid flow contains liquid, and wherein the first fluid flowmeter is insensitive to wetness within the multiphase fluid flow relative to the second fluid flowmeter.

16. The apparatus of claim 15, wherein the processor is adapted to receive first flow velocity signals from the first fluid flowmeter, and second flow velocity signals from the second fluid flowmeter.

* * * * *